United States Patent  [15] 3,636,353
Untermyer  [45] Jan. 18, 1972

[54] METHOD AND APPARATUS FOR THE NONDESTRUCTIVE ASSAY OF BULK NUCLEAR REACTOR FUEL USING 1 KEV. TO 1 MEV. RANGE NEUTRONS

[72] Inventor: Samuel Untermyer, Los Altos, Calif.
[73] Assignee: National Nuclear Corporation, Palo Alto, Calif.
[22] Filed: May 13, 1968
[21] Appl. No.: 728,463

[52] U.S. Cl. ........................... 250/83.1, 250/71.5, 250/83.3, 250/84.5, 313/61
[51] Int. Cl. .......................................... G01t 3/00, G01t 3/02
[58] Field of Search ..................... 250/83.1, 83.3, 84.5, 71.5; 313/61

[56] References Cited

UNITED STATES PATENTS 3,222,521  12/1965  Einfeld ................................. 250/83.1
3,389,254  6/1968  Russell ................................. 250/71.5
3,426,203  2/1969  Youmans .............................. 250/83.1
3,436,538  4/1969  Basdekas .............................. 250/83.1
3,456,113  7/1969  Keepin ................................. 250/83.1

Primary Examiner—James W. Lawrence
Assistant Examiner—Morton J. Frome
Attorney—Flehr, Hohbach, Test, Albritton & Herbert

[57] ABSTRACT

Neutrons having energies confined to a range above thermal and below fast are used to interrogate bulk reactor fuel. Prompt and delayed neutron counting of the reaction products is used to obtain an assay of the valuable fissionable species content of the fuel.

15 Claims, 8 Drawing Figures

INVENTOR.
Samuel Untermyer

INVENTOR.
Samul Untermyer
BY Flehr, Hohbach, Test,
Albritton & Herbert
Attorneys

METHOD AND APPARATUS FOR THE NONDESTRUCTIVE ASSAY OF BULK NUCLEAR REACTOR FUEL USING 1 KEV. TO 1 MEV. RANGE NEUTRONS

BACKGROUND OF THE INVENTION

This invention relates to the method for the nondestructive assay of bulk nuclear reactor fuel and apparatus and more particularly to such a method and apparatus which permits an accurate account of the amount of fissionable species in nuclear reactor fuel elements.

There is a need for a simple, nondestructive assay system which will provide an accurate indication of the fissionable material content of nuclear fuel elements both before and after irradiation in nuclear reactors. Such an assay is needed to eliminate the need for high-cost destructive disassembly and analysis procedures commonly used on reactor fuel elements and to provide accurate fuel inventory accounting to minimize the possibility of theft or diversion of fissionable materials and to lessen the chance for accumulating accounting errors due to inaccurate assays of valuable fissionable materials.

Heretofore, no satisfactory system has evolved for making nondestructive fissionable material assay of nuclear fuel in bulk. Among the present proposals, thermal neutron irradiation suffers from an inability to penetrate bulk quantities of reactor fuel. Fast neutron and photofission interrogation has not been useful since the larger quantities of fertile materials present also react to this interrogation and mask the possible detection of contributions from the fissionable materials. Even when the cross sections differ by as much as an order of magnitude, detection of the fissionable material content is still not possible due to the disproportionate amount of fertile material present. By way of example, the fissionable material U-235 is usually present in only few percent in a bulk reactor fuel containing over 90 percent of the fertile material U-238. Accordingly, there is a need for a new and improved method for nondestructive assay of bulk nuclear reactor fuel and apparatus.

As used herein, the term "fissionable species" connotes those materials which are valuable nuclear fuels and are capable of fissioning under the influence of thermal neutrons. This includes the constituents Pu-239 and U-235. Pu-241 is lumped in with Pu-239 since it is of equivalent value and is usually not separately analyzed. "Fertile species" materials or source materials are any others that are present in the fuel and which have relatively high-fission threshold energies. Such materials are termed fertile materials since they can be converted to fissionable materials by exposure to radiation fluxes in reactors. Fertile species include the constituents U-238, Th-232, and Pu-240. U-238 predominates in present reactor fuels. Th-232 may predominate in certain proposed types of fuels. Pu-240 will only be present in a small percentage as an impurity resulting from neutron capture without fission in Pu-239.

SUMMARY OF THE INVENTION AND OBJECTS

In general, it is an object of the present invention to provide a method for the nondestructive quantitative assay of nuclear reactor fuel for fissionable species, and apparatus, which will overcome the above-named limitations and disadvantages.

Another object of the invention is to provide a method and apparatus of the above character which operates without requiring the disassembly of fuel elements and which provides an accurate accounting of fissionable fuel inventory.

Another object of the invention is to provide a method and apparatus of the above character which is capable of significant penetration of bulk fuel which in such forms as fuel elements, ingots, slugs, slurries, or solutions and which provides an accurate accounting of fissionable species present throughout the volume of such bulk material.

Another object of the invention is to provide a method and apparatus of the above character which is relatively insensitive to commonly encountered radiation fields.

Another object of the invention is to provide a method and apparatus of the above character which is particularly suitable for distinguishing and providing a quantitative assay of the relative amounts of U-235 and Pu-239 (including Pu-241) in bulk reactor fuel.

In general, the present invention results from the observation that the irradiation of bulk nuclear reactor fuel with neutrons having energies confined to a restricted energy range less than the energy of the fission threshold of the fertile species present (above about 0.6 to 1 mev.) but greater than the cross section energy associated with the resonances of the fissionable material (below about 1 kev. to 10 kev.) can be used as basis of quantitative assay of the fissionable species present in the fuel.

By using this restricted range, the radiations induced in the sample of fuel are not masked or dominated by the reaction of the large quantity of fertile species that is present and yet a high penetration of the bulk fuel is still achieved due to the low cross section of the fissionable species present to neutrons of such energy. More specifically, the present invention proposes irradiating the fuel with neutrons having energies preferably in the range of about 10 kev. to 1 mev. and detecting and counting the radiations induced thereby. Prompt neutron detection, delayed neutron detection and gamma detection resulting from the irradiation can be used separately or together to provide information leading to the assay of the fissionable content depending upon the number of constituents present.

These and other objects and features of the present invention will become apparent from the following description and claims when taken in conjunction with the accompanying drawings.

DESCRIPTION OF THE PREFERRED EMBODIMENTS

Figure 1:
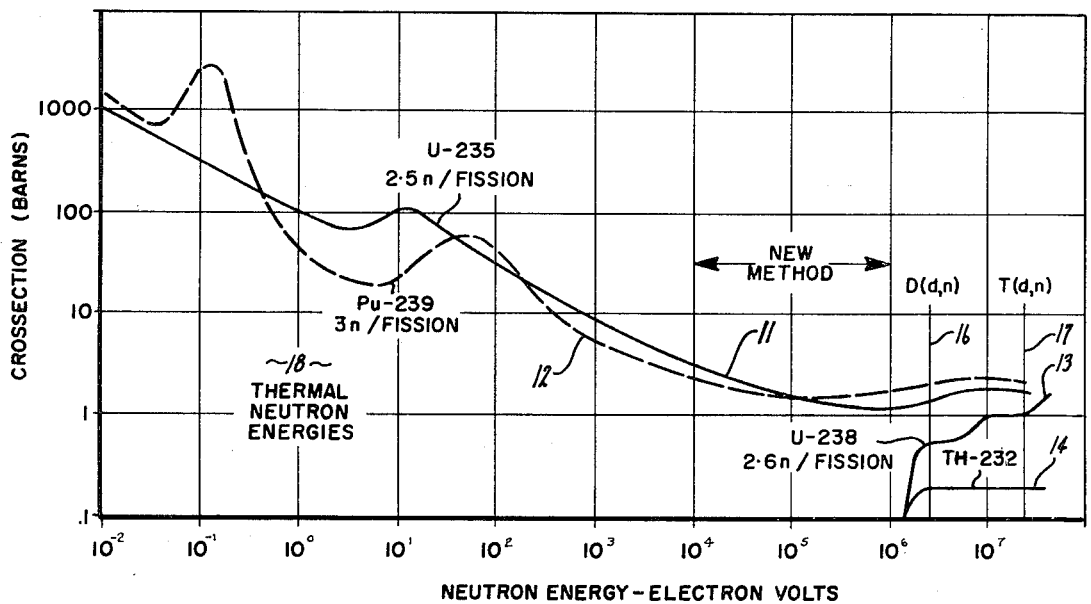
FIG. 1 is a graph depicting fission cross sections for various constituents present in a nuclear reactor fuel element.

Referring to FIG. 1, there is shown graphs of the fission cross sections of the fissionable and fertile species present in a typical nuclear reactor fuel element. Thus, the constituents of the fissionable species are indicated at 11, for U-235 and 12 for Pu-239. As will be observed, for energies up to about 1 kev., the cross section of these fissionable constituents is very large being in general significantly above 10 barns. Above about 1 kev. and especially above 10 kev., the cross section reduces to values below about 5 or 6 barns and remains below this level up to very high incident neutron energies. This is significant because the magnitude of cross section is inversely related to the penetrating power of the input neutron bombardment flux; a large cross section indicates a high probability of being absorbed rather than penetrating.

Graphs are also provided depicting the fission cross section for U-238 (at 13) and Th-232 (at 14). U-238 and Th-232 cross sections are seen to substantially vanish below very high neutron energies. Thus, the incident neutrons must be above about 1 mev. before significant fission probability arises. It is proposed in the present invention to utilize the incident neutron energies of from about a lower limit of 1 kev. to an upper limit of about 1 mev. at an irradiating flux. By using these energies large penetrating power can be obtained due to the low cross section values for the fissionable materials while avoiding the results of permitting higher energy neutrons to cause fissions in the fertile species (U-238, Th-232). Neutrons of this restricted energy range are found to be adequately penetrating without causing fission in the fertile materials. As indicated by the lines 16, 17, D($d,N$) and I($d,N$) reactions produce neutrons of such high energy that they fission significant quantities of the fertile material. This results in large amounts of events due to the large quantity of such material and in this manner masks the events due to fission of the fissionable materials. On the other hand, thermal neutrons (indicated in the region at 18) encounter an extremely high cross section in the fissionable species (U-235 or Pu-239) so that they only penetrate a small region into the fuel bulk (less than about 1 cm.).

Accordingly, in order to avoid unwanted responses from neutrons outside the selected range, it is important that incident neutrons of the present invention be substantially free of such radiations. That is to say, the neutron beam utilized in interrogating the bulk fuel is confined to that within the desired range and is substantially free of thermal neutrons having energies less than the lower limit at from about 1 to 10 kev. and is also free of neutrons having energies greater than the upper limit of the range at about 1 mev.

It is found that in order to provide neutrons of the above energy range, certain restrictions are imposed and specialized apparatus is needed since the commonly available exoergic reactions give too many high-energy neutrons above the desired range. For, it is impossible to moderate or slow such neutrons down into the desired energy range without producing both thermal neutrons and leaving a great many fast neutrons outside of the range. This follows from the fact that the moderation process is statistical and results in a neutron population which follows a statistical distribution law having both fast and thermal contributions.

Figure 2:
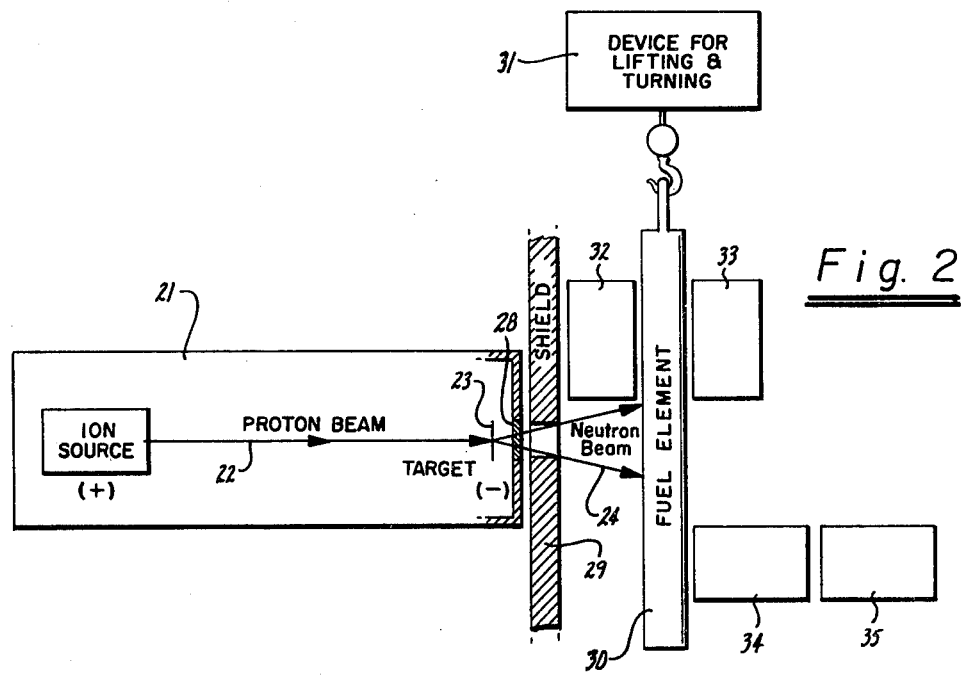
FIG. 2 is a schematic view of apparatus constructed according to the present invention and suitable for carrying out the methods disclosed herein.

Referring to FIG. 2, apparatus for practicing the invention is shown and includes a particle accelerator 21 for creating a stream 22 of charged particles (protons) and causing them to impinge a suitable target 23 made of material for producing a neutron beam 24 of the correct energy range preferably through an endoergic reaction. For reactions disclosed herein, a suitable accelerator is a proton (or deuteron) machine such as the model AN-2000 accelerator sold by High Voltage Engineering Corporation.

The neutron output beam from the target is directed through a suitable window 28 in the machine and a passageway in shielding 29 into a section or region of the fuel element 30 being assayed. Suitable means indicated at 31 is provided for lifting and turning the fuel element so that successive areas thereof can be scanned and assayed. Detector-counters 32, 33 are positioned on each side of the element near the region of inspection for detecting and counting delayed fission neutrons, and, another detector-counter 34 is positioned to one side of the region being inspected for detecting and counting prompt fission neutrons. And, as shown in FIG. 2, detector-counter 34 is shielded from the incident beam 24 both by shield 29 and by being positioned out of the path of the beam. If desired, a gamma detector and spectrometer can also be provided.

There are several nuclear reactions of a character which are preferred as targets 23 for producing neutrons having an energy below the fission threshold for fertile materials. Such reactions include the following:

| | |
|---|---|
| Li7(p,n)Be7 | 1.86 Mev. threshold about 0.3 barns |
| T3(p,n)He3 | 1.019 Mev. threshold about 0.4 barns |
| Be9(p,n)B9 | 1.85 threshold, less yield than Li7 |
| C12(d,n) | 0.26 threshold, low yield |

Figure 3:
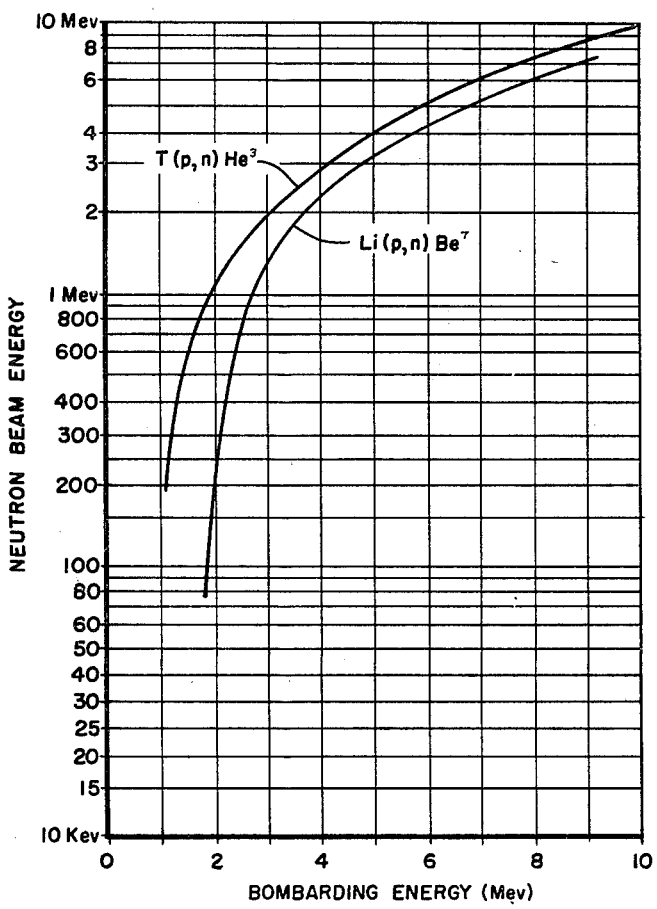
FIG. 3 is a graph of neutron output energy for given input energy for certain nuclear reactors useful for production of neutrons having energies confined to the range required in the present invention.
Figure 4:
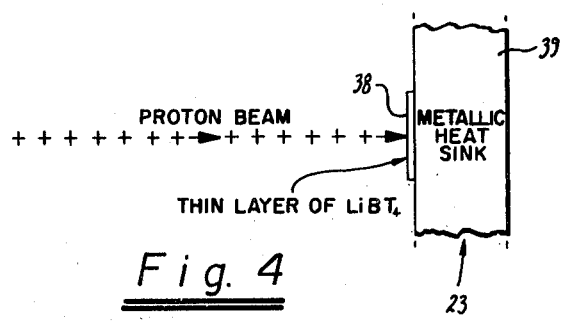
FIG. 4 is a schematic diagram of a LiBT$_4$ target for use with the apparatus of FIG. 2.

FIG. 3 illustrates graphs showing the neutron beam energy from such targets as a function of the charge particle bombarding energy and shows that for bombarding energies in the range from about 1 to 3 mev. neutron beam energies in the range below 1 mev. are provided. Among the reactions listed the proton bombardment of lithium and tritium are preferred reactions mainly because of the relatively high yield of neutron fluxes compared to the two other available reactions. In this connection, the target can be of any of the conventional lithium of tritium bearing materials known to the art such as lithium fluoride, lithium oxide, lithium metal, tritium gas or titanium tritide. Alternatively, a particularly desirable tritium target shown on FIG. 4 consists of lithium-boro-tritide as a thin active layer 38 of LiBT$_4$ disposed on a metallic substrate or support 39 which serves as a heat sink and therefore can be made of a suitable metal such as aluminum. The target is arranged so that the active layer 38 faces the proton beam when the target is installed in the accelerator. This material is stable and nonvolatile in a high vacuum. It does not react with dry air, and it only reacts slowly with the ordinary atmosphere. It contains fewer electrons per tritium nucleus than any other practical tritium solid target material. This can be seen from the formula LiBT$_4$ which has 11 electrons per four tritium nuclei. By comparison, tritium water (T$_2$O) has 10 electrons per two nuclei, and the usual solid tritium target, namely tritiated titanium has approximately 30 electrons per tritium nucleus. As a result, LiBT$_4$ targets yield substantially more neutrons for a given proton beam current since the protons have a greater probability of interacting with a tritium nucleus before being captured by nonproductive interaction with electrons. While LiBT$_4$ is an excellent target material for use in fuel assay, as taught in the present invention, it is not suitable for general use in the experimental production of monoenergetic neutrons because, as will be seen by reference to FIG. 3, two neutron energy groups (one from Li, one from T) are produced when bombarding proton energies exceed 1.86 mev. corresponding to I($p,n$) neutron energies of 800 kev.

Figure 5:
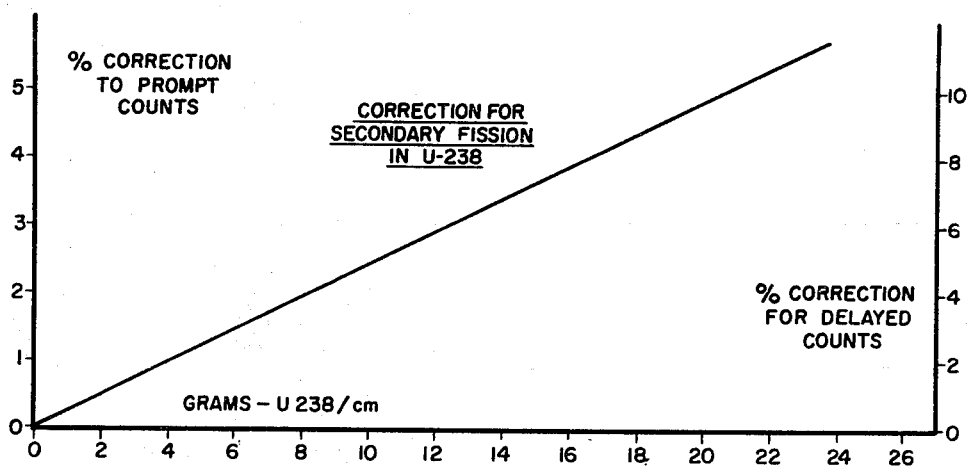
FIGS. 5, 6 and 7 are illustrative calibration graphs for converting delayed and prompt neutron counts obtained from samples of bulk reactor fuel into readings that indicate the fissionable content.
Figure 6:
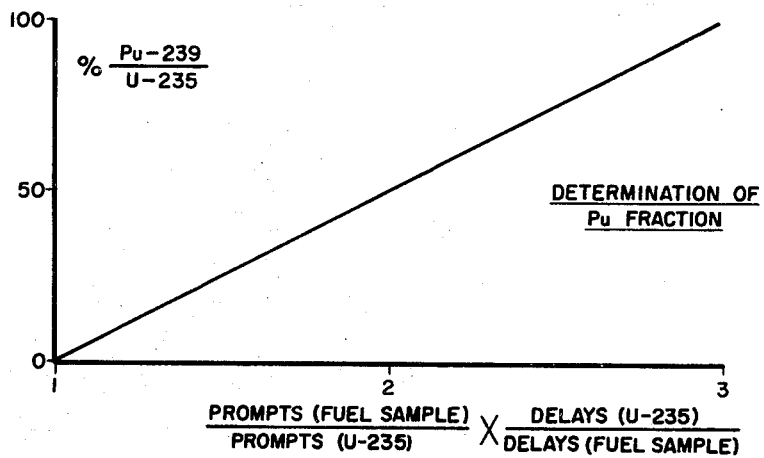
Figure 7:
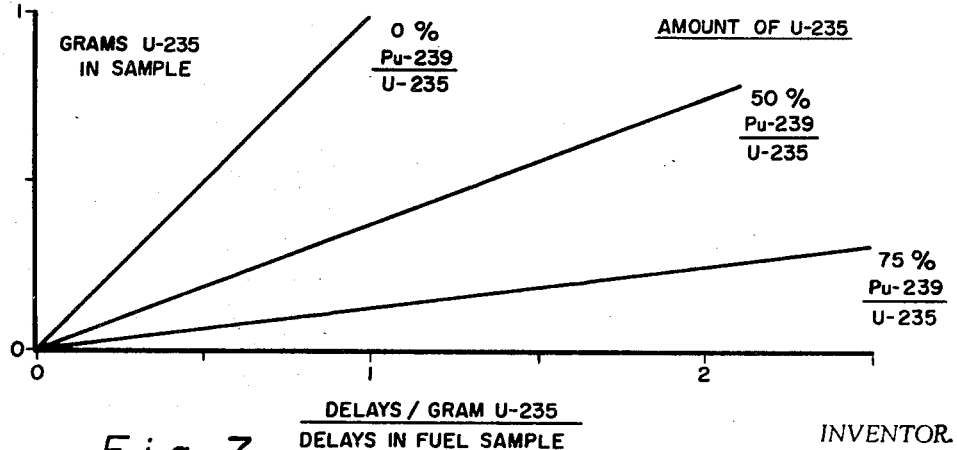

FIGS. 5, 6 and 7 illustrate the type of calibration graphs used to convert delayed and prompt neutron counts obtained using standard samples of U-235 and Pu-239 and bulk reactor fuel into readings that indicate the U-235 and Pu-239 content of the bulk fuel.

The prompt neutron counts are made during irradiation with the restricted energy neutron beam, using detector and counter 34 set up to discriminate against neutrons having energies equal or less than that of the incident beam. A fast neutron counter such as that known as a "Hornyak" counter may be used. This is a scintillation counter using as a detector a plastic material containing about 1 percent silver activated zinc sulfide phosphor. Such a detector is insensitive to gamma rays and to neutrons of less than 1 mev. It is convenient to expose the sample to the beam and count prompt neutrons during a fixed time period approximately as long as the major delayed neutron emitter half-lives. For instance, a 10-second exposure and prompt neutron counting period would be satisfactory.

The delayed neutrons are counted with sensitive neutron detector and counter 32, 33 which need not discriminate against lower energy neutrons. Thus, a so-called "long counter" consisting of thermal neutron counters set in a moderator such as paraffin is satisfactory. These counters are insensitive to gammas and are more efficient than any presently available gamma insensitive fast neutron counters. Delayed neutrons are counted for a fixed time period immediately following irradiation in the restricted energy beam. The counting time should be roughly equal to the predominant delayed neutron delay periods. A counting time of 10 seconds is satisfactory.

A small correction should be first applied to both delayed and prompt neutron counts to allow for multiplication of U-235 and Pu-239 fission neutrons some of which have energy above the threshold for fission in the fertile material (such as U-238). As they leave the fuel sample, a small fraction of these neutrons cause fissions in the fertile material. This is known as the "fast effect." For the purpose of making this small correction, it is usually sufficient to estimate the amount of fertile material present and then use a graph such as FIG. 5 to make this correction.

The corrected counts for the bulk fuel sample, for a standard U-235 sample, and for a standard Pu-239 sample are then used in conjunction with a graph such as FIG. 6 to determine the Pu-239/U-235 ratio in the bulk fuel sample. This graph depends on the experimental fact that U-235 emits substantially more delayed neutrons than a sample of Pu-239 which has the same prompt neutron emission.

After determining the Pu-239/U-235 ratio, the ratio is used with the corrected counting data in conjunction with a parametric series of curves such as shown in FIG. 7 to determine the grams of U-235 and Pu-239 in the volume of the bulk fuel sample traversed by the restricted energy neutron beam. By making a series of such measurements and integrating over the volume of the sample, the U-235 and Pu-239 content of the entire bulk fuel sample can be computed.

If unusually thick fuel samples are to be measured, a correction may be made for incident and emergent beam attenuation. The size of these corrections is reduced because of the penetrating properties of the incident neutron beam, however straightforward nuclear physics calculations or calibration against known samples may be used to determine correction factors to apply for counting rates on very large fuel samples.

When the fuel sample does not emit intense gamma radiation (for instance when the fuel has not been used in a neutronic reactor) then a variation of this method can be used. The high precision gamma spectrometer 35 includes a detector such as lithium drifted germanium with a suitable pulse height sorter and a multichannel analyzer and is used to count the emission of two or more short half-life fission product gamma emitters who fission yield varies widely between U-235 and Pu-239 fission. Any of the many fission products which do not occur near the peak yield mass number are suitable. In particular, the delayed neutron emitting chains fall in this category. In this method, the Pu-239/U-235 ratio is obtained by comparing the intensity of gammas from such emitters, while the U-235 and Pu-239 contents are determined by comparing the strength of specific emitters gamma emission with that from standard samples, using graphs designed for this method and analogous to those for neutron detector assay shown in FIGS. 5, 6 and 7.

It is also evident that various combinations of gamma and neutron detectors can be used with this method, and some of these combinations will be particularly applicable under special circumstances, depending on the gamma radioactivity of the sample, its size, its composition, and other factors.

Figure 8:
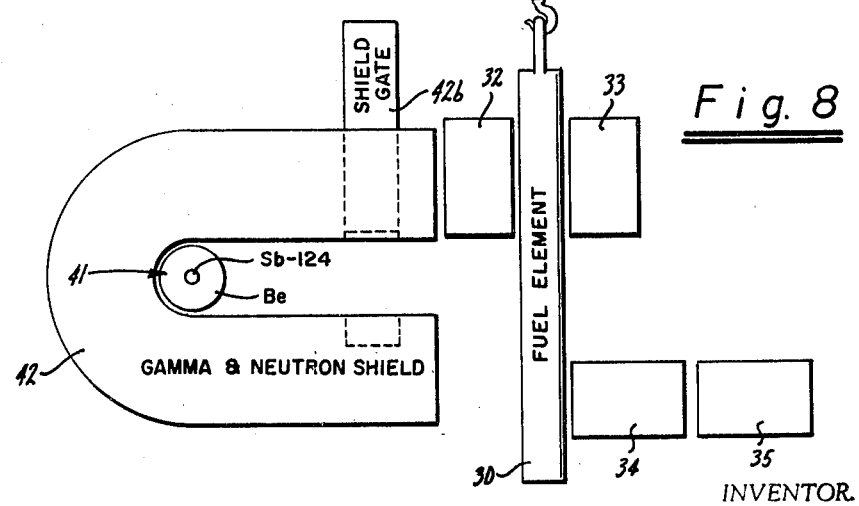
FIG. 8 is a schematic diagram of alternate form of apparatus utilizing a compact neutron source.

Referring to FIG. 8, there is shown apparatus useful for compact, portable application and includes an isotopic neutron source 41 such as 60-day Sb-124, Be-9 (gamma, n-30 kev.) source which replaces the particle accelerator in lightweight, mobile unit applications. The neutron source provides a suitable beam of restricted neutron energy. The remainder of the apparatus is similar to that of FIG. 2. Prompt neutrons are counted while a movable shield gate 42b is open, and delayed neutrons are counted after it is closed. Analysis of the data proceeds as previously discussed.

To those skilled in the art to which the invention relates, many modifications and adaptations of the invention will suggest themselves. Accordingly, the method and apparatus disclosed herein are not to be taken as limitations on the invention but as an illustration thereof.

I claim:

1. Method for the nondestructive assay of bulk nuclear fuel having fissionable species such as U-235 in the presence of significant amounts of fertile species such as U-238 comprising the steps of generating a penetrating neutron beam having an energy spectrum confined in the range between a lower limit at about 1 kev. defined by significant increase in cross section due to large fission resonances of the fissionable species present and an upper limit at about 1 mev. less than the fission threshold of the fertile species, said beam being substantially free of thermal neutrons having energies less than said lower limit and also substantially free of high-energy neutrons having energies greater than said upper limit, irradiating at least a portion of the bulk nuclear fuel by exposing it to said neutron beam in a region thereof in which the energy of said beam remains characterized by an energy content between about 1 kev. to 1 mev. and substantially free of thermal neutrons, detecting and counting prompt fast events caused by the fission neutrons emitted by said bulk nuclear fuel with a fast neutron detector while simultaneously discriminating against the counting of neutrons in the spectral energy range from about 1 kev. to 1 mev., comparing the number of events counted in said last step with counts from similar irradiation of calibrated samples containing known mixtures of fissionable material, fertile material, or mixtures of fission and fertile materials, comparing the total number of counts with that received from samples of known concentration of fertile and fission materials to determine the total amount of fissionable material in that portion of bulk nuclear fuel.

2. A method as in claim 1 in which said fuel contains fissionable constituents U-235 and Pu-239 and in which said step of detecting and counting events caused by the fission products includes detecting and counting prompt fission neutrons emitted by that portion of the fuel with a fast neutron detector while simultaneously discriminating against counts of neutrons in the energy range provided by said beam and further detecting the events caused by the delayed fission products emitted by said bulk nuclear fuel and further comparing the ratio of the number of events detected from the prompt and delayed fission products with the ratio resulting from similar irradiation of known calibrated samples containing mixtures of Pu-239 and U-235 to thereby determine the relative amounts of such Pu-239 and U-235 in said fuel.

3. A method as in claim 1 further including the step of detecting and counting of delayed fission neutrons emitted from the unknown sample to obtain an indication of the amount of fissionable material therein.

4. A method as in claim 1 further including the step of detecting gamma irradiation emanating from said unknown sample, analyzing the spectral content of such gamma irradiation to determine the amount of fissionable material in said unknown sample.

5. A method as in claim 1 further including the steps of irradiating said unknown sample of bulk nuclear fuel with high-energy neutrons above the threshold of reaction for the fertile material therein and detecting the events caused by delayed fission products resulting from said high-energy irradiation to measure the fertile material content thereof.

6. A method as in claim 1 further including the step of weighing the bulk nuclear fuel and allowing for the weight of the cladding and to thereby determine the fertile species content of said fuel.

7. Apparatus for the nondestructive assay of bulk nuclear fuel having fissionable species such as U-235, Pu-239, Pu-241 in the presence of significant amounts of fertile species such as U-238, Th-232 comprising, means for generating a penetrating neutron beam having an energy spectrum confined in the range between the lower limit at about 1 to 10 kev. defined by significant increase in cross section due to large fission resonances of fissionable species present, and an upper limit at about 0.6 to 1 mev. which is less than the fission threshold of the fertile species, said beam being substantially free of thermal neutrons having energies less than said lower limit and also substantially free of high-energy neutrons having energies greater than said upper limit, means for confining the beam to a specific region in which the energy of said beam remains characterized by an energy content between about 1 kev. and 1 mev. and substantially free of thermal neutrons, means for supporting said nuclear fuel in the path of said beam at said region, a fast neutron detector for detecting prompt fast events caused by fission in said nuclear fuel while simultaneously discriminating against the counting of neutrons in a spectral energy range corresponding to said interrogating neutron beam from 1 kev. to 1 mev., said detector being shielded from the incident beam, means for counting the events registered by said detector.

8. Apparatus as in claim 7 in which said neutrons are produced to provide a flux level greater than $10^8$ neutrons per burst in the forward direction.

9. Apparatus as in claim 7 in which said source includes means for generating an ion beam, a target positioned in the path of said ion beam, said target being made of material capable of undergoing a nuclear reaction to produce neutrons when bombarded by said ion beam.

10. Apparatus as in claim 9 in which said target consists of a Lithium–7 and said ion beam as a proton beam to reacting by the formula Li7(p,n).

11. Apparatus as in claim 9 in which said target consists of Tritium and in which said beam is a proton beam reacting according to the formula T(p,N).

12. Apparatus as in claim 9 in which said means for generating an ion beam consists of a positive ion accelerator.

13. Apparatus as in claim 9 in which the target consists of $LiBT_4$.

14. Apparatus as in claim 7 in which said means for generating a neutron beam consists of a radioactive source.

15. Apparatus as in claim 14 in which said radioactive source consists of an Sb, Be source utilizing the reaction Be9 (gamma,n).

* * * * *